United States Patent
Ramanathan et al.

(10) Patent No.: US 8,949,854 B2
(45) Date of Patent: Feb. 3, 2015

(54) SYSTEM AND METHOD FOR ACCESSING REALLY SIMPLE SYNDICATION (RSS) ENABLED CONTENT USING SESSION INITIATION PROTOCOL (SIP) SIGNALING

(75) Inventors: Sri Ramanathan, Lutz, FL (US); Frank Andre Schaffa, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 13/418,502

(22) Filed: Mar. 13, 2012

(65) Prior Publication Data

US 2012/0185573 A1  Jul. 19, 2012

Related U.S. Application Data

(63) Continuation of application No. 11/876,926, filed on Oct. 23, 2007, now Pat. No. 8,191,082.

(51) Int. Cl.
*G06F 9/46* (2006.01)
*G06F 15/163* (2006.01)
*G06F 13/38* (2006.01)
*G06F 17/30* (2006.01)
*H04L 29/06* (2006.01)
*H04L 29/08* (2006.01)

(52) U.S. Cl.
CPC ........ *G06F 17/3089* (2013.01); *H04L 65/1006* (2013.01); *H04L 67/2847* (2013.01); *H04L 67/26* (2013.01); *H04L 67/28* (2013.01); *H04L 65/1016* (2013.01); *H04L 67/306* (2013.01); *H04L 67/02* (2013.01)
USPC ........... 719/311; 719/318; 455/403; 709/217; 709/219; 707/705

(58) Field of Classification Search
None
See application file for complete search history.

(56) References Cited

U.S. PATENT DOCUMENTS

| | | | |
|---|---|---|---|
| 7,028,306 B2 | 4/2006 | Boloker et al. |
| 7,424,516 B2 | 9/2008 | Leeds |
| 7,840,582 B2 | 11/2010 | Ponnappan et al. |
| 2005/0125504 A1 | 6/2005 | Leeds |
| 2006/0129916 A1 | 6/2006 | Volk et al. |
| 2006/0155852 A1 | 7/2006 | Mayer et al. |
| 2006/0253567 A1 | 11/2006 | Selin et al. |

(Continued)

OTHER PUBLICATIONS

Roach, A. B., Session Initiation Protocol (SIP)—Specific Event Notification, Internet Engineering Task Force, Network Working Group, Request for Comment #3265, Jun. 2002, 38 pages.

(Continued)

*Primary Examiner* — Qing Wu
(74) *Attorney, Agent, or Firm* — Schmeiser, Olsen & Watts, LLP; John R. Pivnichny

(57) ABSTRACT

A system and associated method for subscribing Really Simple Syndication (RSS) enabled content using the Session Initiation Protocol (SIP) are disclosed. An application server coupled to a Hypertext Transfer Protocol (HTTP) server in the Internet intermediates a SIP message and a request for a RSS feed. An end device requests subscription of the RSS feed in a SIP message. The HTTP server enables the application server to subscribe the RSS feed and to track changes in the RSS feed over the Internet by use of a Serving Call/Session Control Function (S-CSCF) servicing the SIP message. The HTTP server enables the end device subscribing the RSS feed to fetch the web content from the media cache in later part of the subscription by providing updates to the application server.

8 Claims, 6 Drawing Sheets

(56) References Cited

U.S. PATENT DOCUMENTS

| | | |
|---|---|---|
| 2006/0259492 A1 | 11/2006 | Jun et al. |
| 2006/0287989 A1 | 12/2006 | Glance |
| 2007/0043872 A1 | 2/2007 | Pattan et al. |
| 2007/0094389 A1 | 4/2007 | Nussey et al. |
| 2007/0100836 A1 | 5/2007 | Eichstaedt et al. |
| 2007/0100960 A1 | 5/2007 | Eichstaedt et al. |
| 2007/0143502 A1 | 6/2007 | Garcia-Martin et al. |
| 2008/0163318 A1 | 7/2008 | Chen et al. |
| 2009/0100124 A1 | 4/2009 | Apelqvist |
| 2009/0106768 A1 | 4/2009 | Ramanathan et al. |
| 2009/0248686 A1 | 10/2009 | Ponnappan et al. |

OTHER PUBLICATIONS

Rosenberg, et al., SIP: Session Initiation Protocol, Internet Engineering Task Force, Network Working Group, Request for Comment #3261, Jun. 2002, 269 pages.

Kim, et al.; Session and connection management for QoS-Guaranteed multimedia service provisioning on IP/MPLS networks; 2005; abstract only; 1 page.

Ruiz, et al.; Adaptive Multimedia Multi-party Communication in Ad Hoc Environments; IEEE Proceedings of the 37th Hawaii International Conference on System Sciences 2004; 10 pages.

Guenkova-Luy, et al.; End-to-End Quality-of-Service Coordination for Mobile Multimedia Applications; IEEE Journal On Selected Areas In Communications, vol. 22, No. 5, Jun. 2004; pp. 889-903.

Koutsorodi, et al.; Terminal Management and Intelligent Access Selection in Heterogeneous Environments; Mobile Networks and Applications (2006); pp. 861-871.

Mahy, R., Plantronics, Change Notifications about HyperText Transfer Protocol (HTTP) Resources via the Session Initiation Protocol (SIP) Event Notification Framework; draft-mahy-http-change-notification-via-sip-OO.txt., IETF Standard-Working-Draft, Internet Engineering Task Force, IETF, CH Jun. 25, 2007.

Notice of Allowance (Mail Date (Jul. 14, 2010) for U.S. Appl. No. 12/056,605, filed Mar. 27, 2008; Confirmation No. 9861.

Office Action (Mail Date Sep. 6, 2011) for U.S. Appl. No. 11/876,926, filed Oct. 23, 2007; Confirmation No. 7075.

Amendment filed Dec. 6, 2011 in response to Office Action (Mail Date Sep. 6, 2011) for U.S. Appl. No. 11/876,926, filed Oct. 23, 2007; Confirmation No. 7075.

Notice of Allowance (Mail Date Jan. 25, 2012) for U.S. Appl. No. 11/876,926, filed Oct. 23, 2007; Confirmation No. 7075.

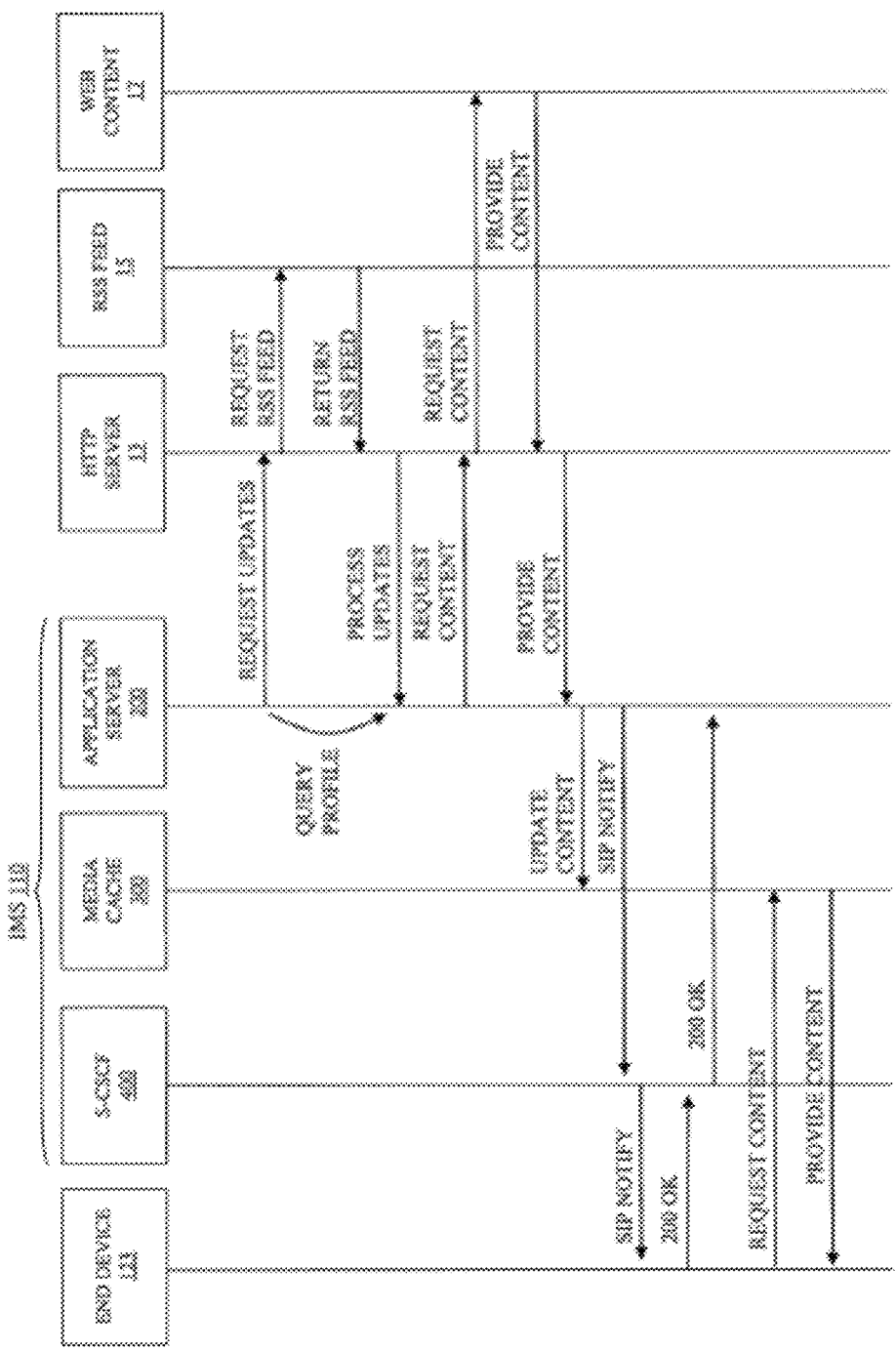

SYSTEM AND METHOD FOR ACCESSING REALLY SIMPLE SYNDICATION (RSS) ENABLED CONTENT USING SESSION INITIATION PROTOCOL (SIP) SIGNALING

This application is a continuation application claiming priority to Ser. No. 11/876,926, filed Oct. 23, 2007, now U.S. Pat. No. 8,191,082, issued May 29, 2012.

FIELD OF THE INVENTION

The present invention discloses a system and associated method for feeding rapidly changing web content employing Really Simple Syndication (RSS) mechanism to mobile devices through IP Multimedia Subsystem using the Session Initiation Protocol (SIP).

BACKGROUND OF THE INVENTION

A conventional web feeding mechanism called Really Simple Syndication (RSS) provides up-to-date web content to users by polling and updating changes to the web content across the Internet. When a user accesses the web content with a mobile device, RSS web feeding wastes too much communication bandwidth in polling changes to the web content. The RSS web feeding also needs to be connected to the Internet to perform polling. Also, there is no Quality of Service (QoS) for the transferred web content because the transfer is subject to current state of the Internet.

Thus, there is a need for a system and associated method that overcomes at least one of the preceding disadvantages of current methods and systems for RSS web feeding for mobile devices.

SUMMARY OF THE INVENTION

According to one embodiment of the present invention, a method for tracking web content serviced by a Hypertext Transfer Protocol (HTTP) server in the Internet to feed an end device coupled to an Internet Protocol (IP) Multimedia Subsystem (IMS), wherein the web content is summarily represented by an Really Simple Syndication (RSS) document accessible by the HTTP server, wherein the IMS comprises an application server and a media cache, wherein the application server processes both the RSS document and the Session Initiation Protocol (SIP), wherein the application server is coupled to the HTTP server of the Internet outside of the IMS, the method comprises: retrieving, by the HTTP server, the web content responsive to receiving a request for metadata of the web content from the end device; and relaying the retrieved web content to the end device such that the end device subsequently send a SIP SUBSCRIBE request for the RSS document and the web content to the application server for subscription by use of the relayed web content, wherein the RSS document and the web content is serviced by the HTTP server.

According to one embodiment of the present invention, a computer program product, comprising a computer usable storage device having a computer readable program code embodied therein, said computer readable program code containing instructions that when executed by a processor of a computer system implement tracking web content serviced by a Hypertext Transfer Protocol (HTTP) server in the Internet to feed an end device coupled to an Internet Protocol (IP) Multimedia Subsystem (IMS).

According to one embodiment of the present invention, a computer system comprising a processor and a computer readable memory unit coupled to the processor, said memory unit containing instructions that when executed by the processor implement tracking web content serviced by a Hypertext Transfer Protocol (HTTP) server in the Internet to feed an end device coupled to an Internet Protocol (IP) Multimedia Subsystem (IMS).

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing tracking web content serviced by a Hypertext Transfer Protocol (HTTP) server in the Internet to feed an end device coupled to an Internet Protocol (IP) Multimedia Subsystem (IMS).

DETAILED DESCRIPTION OF THE INVENTION

Figure 1:
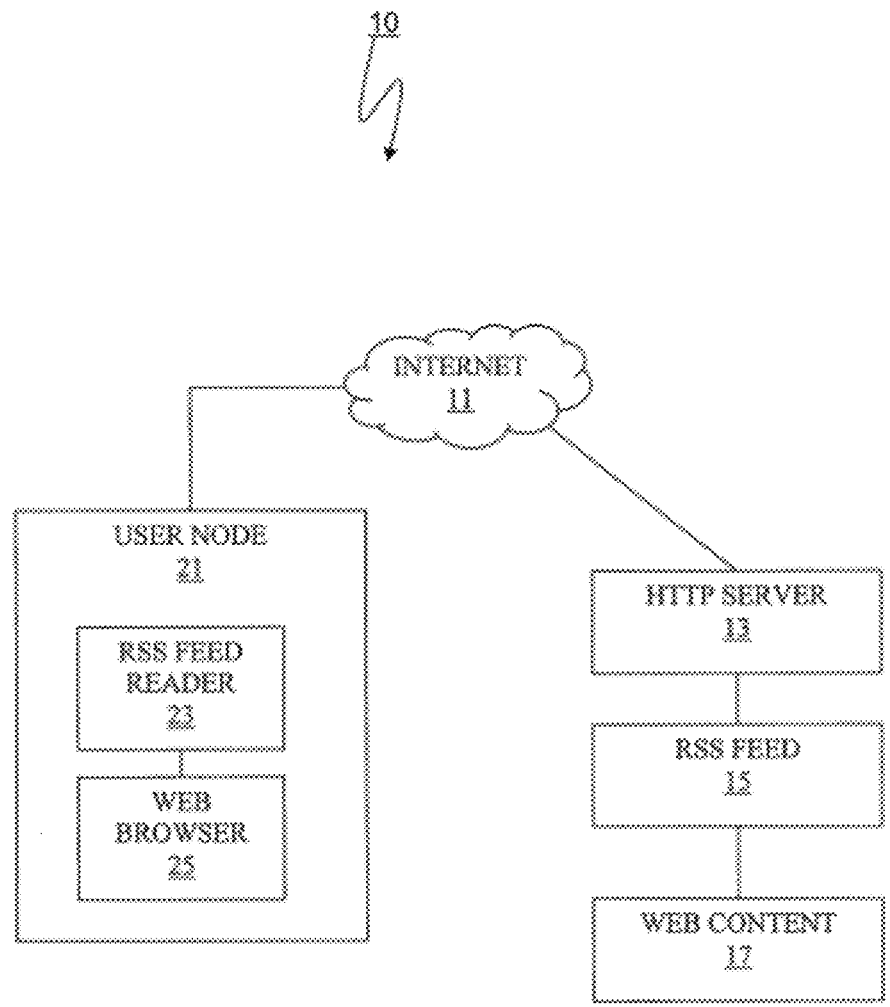
FIG. 1 illustrates a conventional Really Simple Syndication (RSS) web feeding system for RSS web feeding for a user node.

FIG. 1 illustrates a conventional Really Simple Syndication (RSS) web feeding system 10 for RSS web feeding for a user node 21.

The conventional RSS web feeding system 10 comprises the Internet 11, an HTTP server 13, a RSS feed 15, web content 17, and a user node 21. The user node 21 comprises RSS feed reader 23 and a web browser 25. Throughout the specification, the term content and the phrase web content are interchangeably used.

Web content 17 is typically a Hypertext Markup Language (HTML) document of a webpage or links to webpages and other kinds of digital media.

An RSS feed 15 is a document that contains either a summarized or unabridged version of the web content 17, typically in Extensible Markup Language (XML) format. RSS means web feed formats and related technology which are used to publish frequently updated web content 17. RSS web feeding is widely used in publishing real time information. Examples of such web content may be, inter alia, stock price ticker, blog entries, news headlines, weather updates, or podcasts. With RSS, users can automatically keep up with the latest information of web sites they subscribe to.

An RSS feed reader 23 is a software program enabling subscription of an RSS feed 15. A user subscribes to a specific RSS feed 15 by entering a link to the RSS feed 15 into the RSS feed reader 23 or by clicking an RSS icon in a web browser 25. The RSS icon in the web browser 25 is linked to a client application that initiates the subscription process. The RSS feed reader 23 polls the RSS feed 15 subscribed by a user for new web content 17, and downloads any updates with the RSS feed 15.

Figure 2:
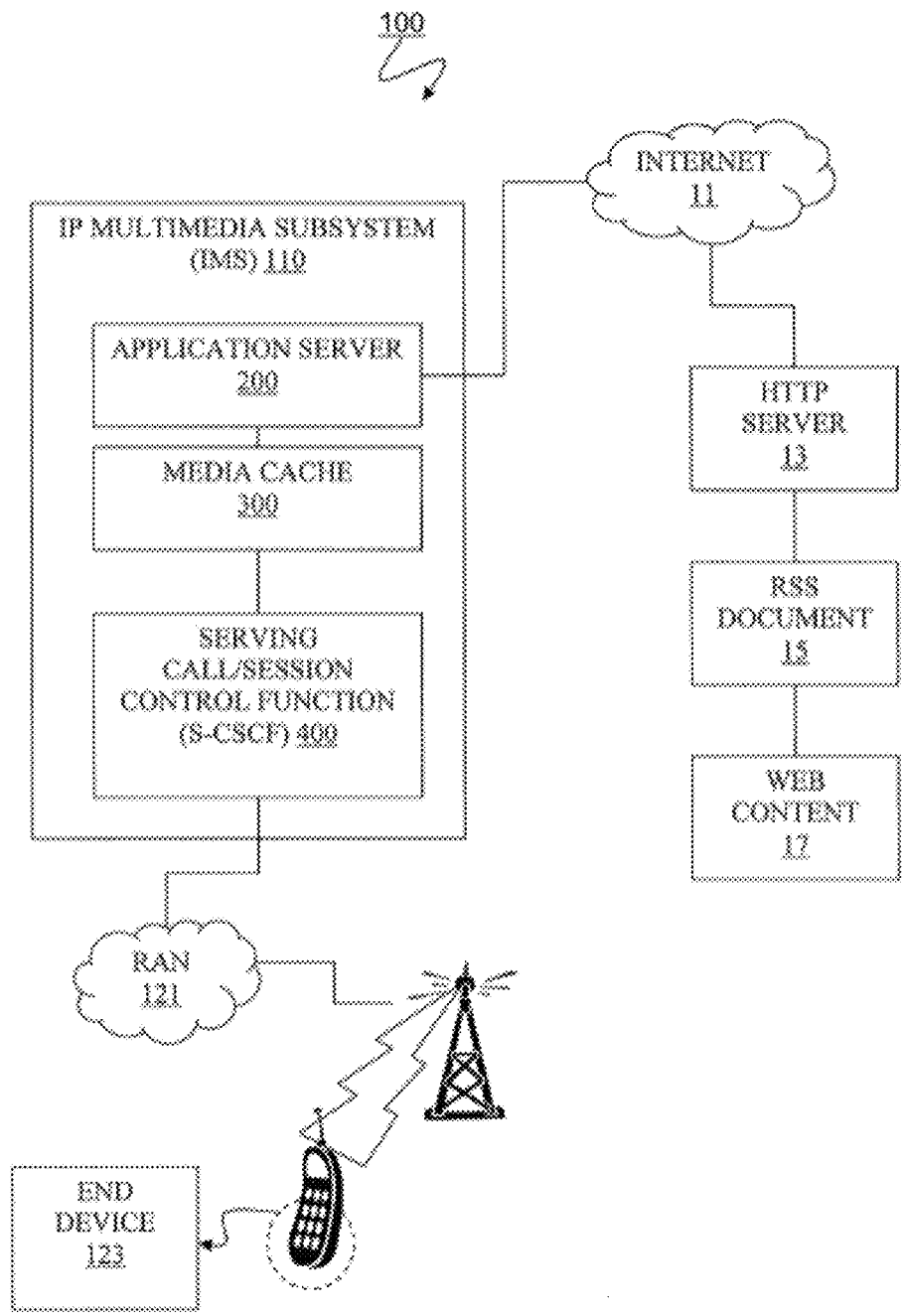
FIG. 2 illustrates a system for the RSS web feeding by the Session Initiation Protocol (SIP) signaling for an end device coupled to an IP Multimedia Subsystem (IMS) through a Radio Access Network (RAN), in accordance with embodiments of the present invention.

FIG. 2 illustrates a system 100 for the RSS web feeding by the Session Initiation Protocol (SIP) signaling for an end device 123 coupled to an IP Multimedia Subsystem (IMS) 110 through a Radio Access Network (RAN) 121, in accordance with embodiments of the present invention.

The IMS 110 is an architectural framework for delivering IP multimedia data to mobile users in various wireless communication services designed by the standard organization called 3rd Generation Partnership Project (3GPP). In this specification, a 3GPP standard includes but not limited to a current standard, any variation and/or an improvement of such standard. The IMS 110 comprises three functional layers called a service plane, a control plane and a transport plane.

The IMS service plane comprises an application server 200 and a media cache 300. The application server 200 process SIP requests and provides access to RSS enabled web content. The media cache 300 stores IP multimedia data within the IMS 110. The IMS control plane comprises a Serving Call/Session Control Function (S-CSCF) 400. The S-CSCF is a collection of SIP servers or proxies that process SIP signaling packets to control a call/session communicated through the IMS 110. The IMS transport plane provides physical access to the RAN 121.

To effectively integrate with the Internet 11, the IMS 110 uses the Internet Engineering Task Force (IETF) protocols, in as many cases as possible. The SIP is an application-layer control protocol written by IETF for creating, modifying, and terminating sessions with one or more participants.

The end device 123 means a SIP User Agent (UA) which can originate and/or receive SIP calls. Examples of the end device 123 may be, inter alia, a mobile phone, a Personal Digital Assistant (PDA), a laptop, a Personal Computer (PC), or an endpoint such as an answering machine. The IMS 110 provides services to multiple SIP UAs. In a communication controlled by SIP, media streams for actual data transmission take a discrete channel.

Figure 3:
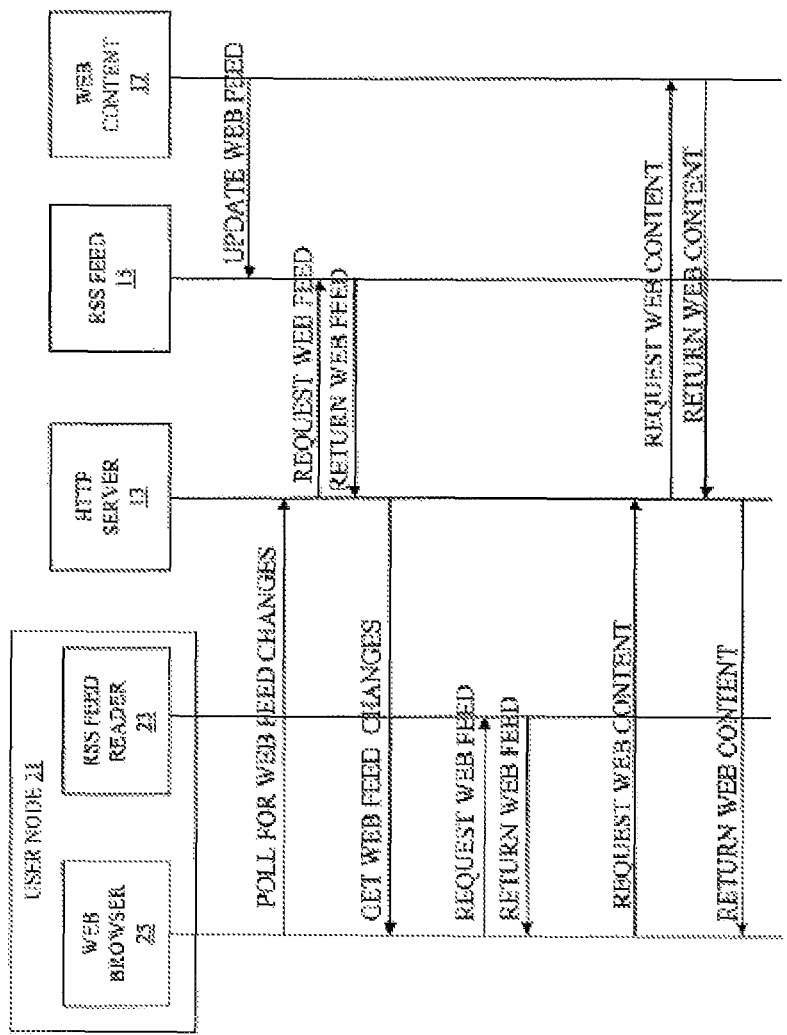
FIG. 3 illustrates a message flow of a conventional RSS web feeding for a user node in FIG. 1, supra.

FIG. 3 illustrates a message flow of a conventional RSS web feeding for a user node 21 in FIG. 1, supra.

Upon updating the web content 17 by an author, the RSS feed 15 that represents the web content 17 is also updated. As noted earlier, the RSS feed 15 is an XML document that contains either a summary of the web content 17 or the web content 17 itself. For the purpose of this description, the RSS feed 15 is regarded as a summary of the web content 17 to be distinguished from the web content 17. The HTTP server 13 provides the RSS feed 15 to the Internet 11.

The user node 21 comprises the web browser 25 and the RSS feed reader 23. The web browser 25 fetches the RSS feed 15 through the RSS feed reader 23. The RSS feed reader 23 periodically polls the HTTP server 13 for updates of the RSS feed 15. When there is an update of the RSS feed 15, the HTTP server 13 fetches such update from the RSS feed 15. The HTTP server 13 then provides updates to the RSS feed reader 23 and the web browser 25.

A polling message from the web browser 25 is sent out periodically to track the updates with the web content 17 during a communication session. As a result, the RSS feed reader 23 maintains up-to-date summary information of the web content 17 in a same manner as the RSS feed 15 across the Internet 11. Consequently, a user of the web browser 25 can retrieve the RSS feed 15 from the RSS feed reader 23, upon a request for summary information contained in the RSS feed 15.

In case that users of the web browser 25 need the web content 17 in its entirety other than just a summary information in the RSS feed 15, the RSS feed reader 23 reaches to the web content 17 through the HTTP server 13 that hosts the web content 17.

Figure 4:
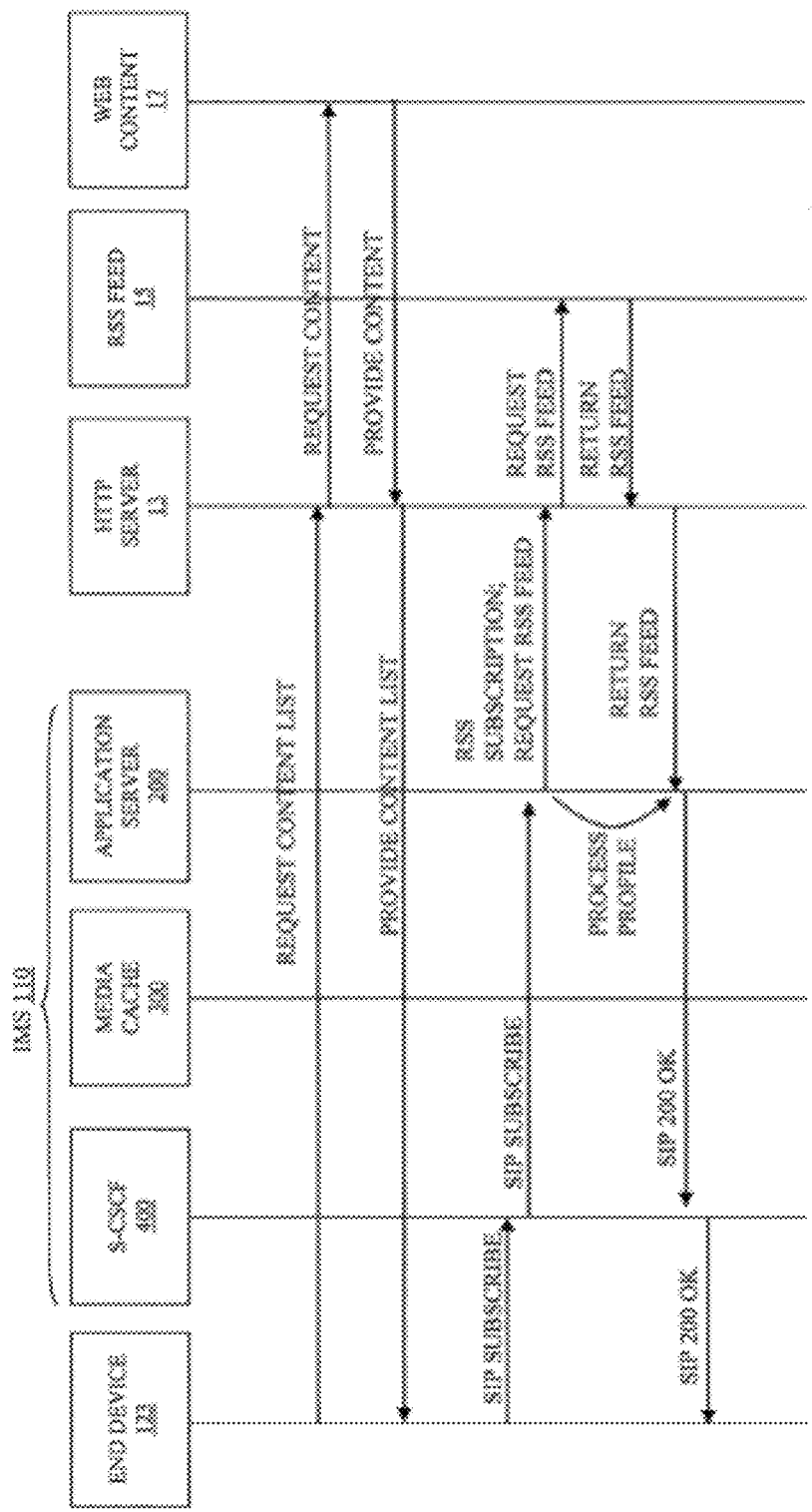
FIG. 4 is a message flowchart depicting a method for RSS web feeding by the SIP signaling for an end device coupled to an IMS of FIG. 2, supra, in accordance with embodiments of the present invention.

FIG. 4 is a message flowchart depicting a method for RSS web feeding by the SIP signaling for an end device 123 coupled to an IMS 110 of FIG. 2, supra, in accordance with embodiments of the present invention.

Messages inherent to the SIP based registration and possible subsequent re-registration within the S-CSCF and the flows implied as part of the Initial Filter Criteria (IFC) are not illustrated in FIG. 4.

The end device 123 requests metadata of the web content 17 to the HTTP server 13 across the Internet 11 via a standard data session. The HTTP server 13 looks into the web content 17 for metadata requested by the end device 123. The HTTP server 13 then passes on the web content 17 with metadata to the end device 123 that had requested metadata of the web content 17.

A user of the end device 123 selects a certain subset of RSS feed to which the user desires to subscribe. Once subscribed, the RSS feed is monitored for change and any change is communicated to a subscriber pursuant to the SIP event notification. The end device 123 sends a SIP SUBSCRIBE message to the S-CSCF 400 to request a subscription of the RSS feed 15 which is specified by metadata of the web content 17.

The SIP SUBSCRIBE and the SIP NOTIFY request messages are used in conjunction with each other for SIP based event notification. A SIP user agent (UA) subscribes an event by sending the SIP SUBSCRIBE message to a SIP server, and then, once the SIP server registers such subscription request by the SIP UA, the SIP server sends back the SIP NOTIFY message to the SIP UA when the subscribed event occurs. For details, see Request For Comments (RFC) 3265 by the Internet Engineering Task Force (IETF). The SIP 200 OK response message is an acknowledgement for successful process of a request. See RFC 3261 for details.

The S-CSCF 400 routes the SIP SUBSCRIBE message received from the end device 123 to the application server 200. The application server 200 processes the subscription request in the SIP SUBSCRIBE message and registers the RSS feed subscribed and the end device requesting the subscription. The application server 200 then locates the RSS feed 15 and tracks changes in the RSS feed 15 across the Internet 11 through the HTTP server 13. The application server 200 maintains a subscriber profile which contains properties to serve a subscribing end device or a subscriber. The information in the subscriber profile may be, inter alia, a polling frequency, content delimits, a response priority, and update response limits. Subsequent to the subscription request, the application server 200 updates any provisioning information that is necessary for the subscriber profile. Examples of provisioning information may be, inter alia, image size, available file formats for the communication, etc. Then the application server 200 sends a standard SIP 200 OK message back to the end device 123 via the S-CSCF 400.

The application server 200 uses the subscriber profile to determine if the content of the RSS feed 15 has changed. When the application server 200 detects a change of the RSS feed 15, then the application server 200 updates the content of the media cache 300 with updated content of the RSS feed 15, and sends a SIP NOTIFY message to the end device 123 via the S-CSCF 400. The end device 123 sends a SIP 200 OK message upon receiving the SIP Notify message, and the S-CSCF 400 transfers the message to the application server 200.

Because content of the RSS feed 15 stored in the media cache 300 is identical to the RSS feed 15 across the Internet 11, the end device 123 requests the RSS feed 15 from the media cache 300 and retrieves content of the RSS feed 15 during the rest of the subscription in a same communication session, instead of generating data traffic across the Internet 11.

Figure 5:
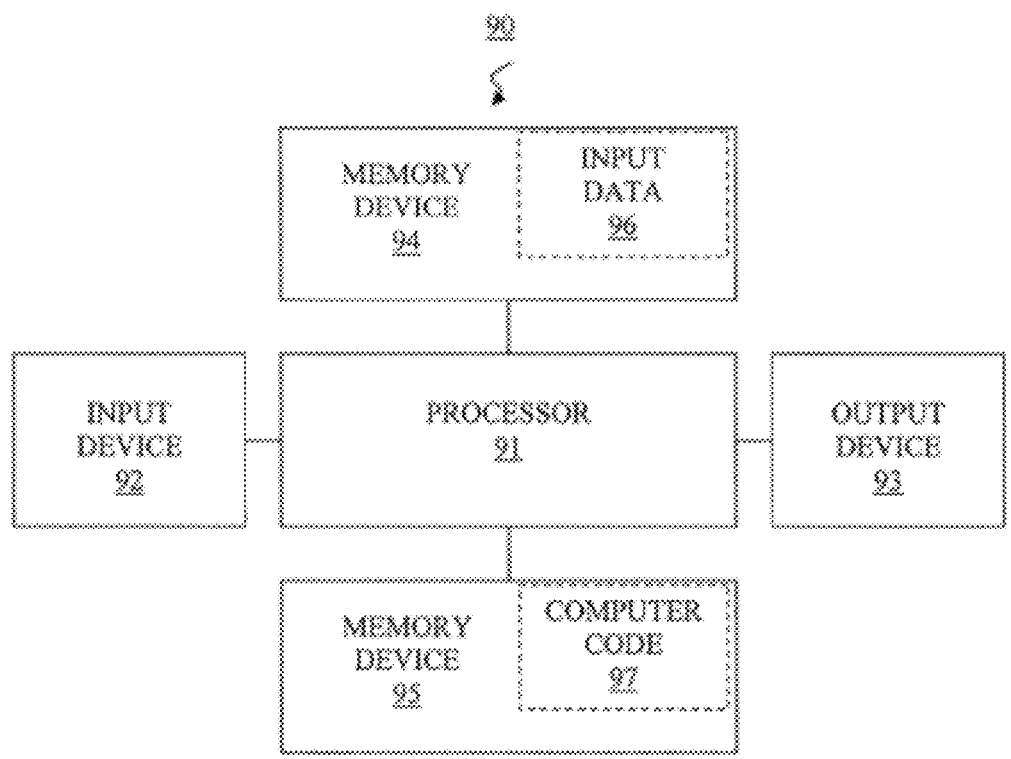
FIG. 5 illustrates a computer system used for RSS web feeding by the SIP signaling for an end device coupled to an IMS of FIG. 2, supra, in accordance with embodiments of the present invention.

FIG. 5 illustrates a computer system 90 used for RSS web feeding by the SIP signaling for an end device coupled to an IMS 110 of FIG. 2, supra, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for RSS web feeding with SIP signaling according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Any of the components of the present invention can be deployed, managed, serviced, etc. by a service provider that offers to deploy or integrate computing infrastructure with respect to a process for RSS web feeding with SIP signaling of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for RSS web feeding with SIP signaling.

In another embodiment, the invention provides a business method that performs the process steps of the invention on a subscription, advertising and/or fee basis. That is, a service provider, such as a Solution Integrator, can offer to create, maintain, support, etc. a process for RSS web feeding with SIP signaling of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for tracking web content serviced by a Hypertext Transfer Protocol (HTTP) server in the Internet to feed an end device coupled to an Internet Protocol (IP) Multimedia Subsystem (IMS), wherein the web content is summarily represented by an Really Simple Syndication (RSS) document accessible by the HTTP server, wherein the IMS comprises an application server and a media cache, wherein the application server processes both the RSS document and a Session Initiation Protocol (SIP), wherein the application server is coupled to the HTTP server of the Internet outside of the IMS, the method comprising:

retrieving, by the HTTP server via a processor of a computer system, the web content responsive to receiving a request for metadata of the web content from the end device; and said processor relaying the retrieved web content to the end device such that the end device subsequently sends a SIP SUBSCRIBE request for the RSS document and the web content to the application server for subscription by use of the relayed web content, wherein the RSS document and the web content is serviced by the HTTP server.

2. The method of claim 1, said method further comprising:

subsequent to said relaying, said processor receiving a query from the application server inquiring whether the RSS document subject to the SIP SUBSCRIBE had been updated;

said processor determining that the RSS document had been updated pursuant to a subscriber profile, wherein the application server utilizes the subscriber profile to control update tracking of the RSS document;

said processor receiving, from the application server, a request to provide updates of the web content represented by the RSS document; and said processor providing the updates of the web content specified in the received request to the application server such that the end device is enabled to receive the updates subject to the SIP SUBSCRIBE subscription.

3. The method of claim 1, said method further comprising:

providing at least one support service for at least one of creating, integrating, hosting, maintaining, and deploying computer-readable program code in the computer system, wherein the program code is executed by the processor to implement said retrieving and said relaying.

4. The method of claim 3, said method further comprising:

subsequent to said relaying, said processor receiving a query from the application server inquiring whether the RSS document subject to the SIP SUBSCRIBE had been updated;

said processor determining that the RSS document had been updated pursuant to a subscriber profile, wherein the application server utilizes the subscriber profile to control update tracking of the RSS document;

said processor receiving, from the application server, a request to provide updates of the web content represented by the RSS document; and said processor providing the updates of the web content specified in the received request to the application server such that the end device is enabled to receive the updates subject to the SIP SUBSCRIBE subscription.

5. A computer program product, comprising a computer usable storage device having a computer readable program code stored therein, said computer readable program code containing instructions that when executed by a processor of a computer system implement a method for tracking web content serviced by a Hypertext Transfer Protocol (HTTP) server in the Internet to feed an end device coupled to an Internet Protocol (IP) Multimedia Subsystem (IMS), wherein the web content is summarily represented by an Really Simple Syndication (RSS) document accessible by the HTTP server, wherein the IMS comprises an application server and a media cache, wherein the application server processes both the RSS document and a Session Initiation Protocol (SIP), wherein the application server is coupled to the HTTP server of the Internet outside of the IMS, said method comprising:

said processor retrieving, by the HTTP server, the web content responsive to receiving a request for metadata of the web content from the end device; and said processor relaying the retrieved web content to the end device such that the end device subsequently sends a SIP SUBSCRIBE request for the RSS document and the web content to the application server for subscription by use of the relayed web content, wherein the RSS document and the web content is serviced by the HTTP server.

6. The computer program product of claim 5, said method further comprising:

subsequent to said relaying, said processor receiving a query from the application server inquiring whether the RSS document subject to the SIP SUBSCRIBE had been updated;

said processor determining that the RSS document had been updated pursuant to a subscriber profile, wherein the application server utilizes the subscriber profile to control update tracking of the RSS document;

said processor receiving, from the application server, a request to provide updates of the web content represented by the RSS document; and said processor providing the updates of the web content specified in the received request to the application server such that the end device is enabled to receive the updates subject to the SIP SUBSCRIBE subscription.

7. A computer system comprising a processor and a computer readable memory unit coupled to the processor, said memory unit containing instructions that when executed by the processor implement a method for tracking web content serviced by a Hypertext Transfer Protocol (HTTP) server in the Internet to feed an end device coupled to an Internet Protocol (IP) Multimedia Subsystem (IMS), wherein the web content is summarily represented by an Really Simple Syndication (RSS) document accessible by the HTTP server, wherein the IMS comprises an application server and a media cache, wherein the application server processes both the RSS document and a Session Initiation Protocol (SIP), wherein the application server is coupled to the HTTP server of the Internet outside of the IMS, said method comprising:

said processor retrieving, by the HTTP server, the web content responsive to receiving a request for metadata of the web content from the end device; and said processor relaying the retrieved web content to the end device such that the end device subsequently sends a SIP SUBSCRIBE request for the RSS document and the web content to the application server for subscription by use of the relayed web content, wherein the RSS document and the web content is serviced by the HTTP server.

8. The computer system of claim 7, said method further comprising:

subsequent to said relaying, said processor receiving a query from the application server inquiring whether the RSS document subject to the SIP SUBSCRIBE had been updated;

said processor determining that the inquired RSS document had been updated pursuant to a subscriber profile, wherein the application server utilizes the subscriber profile to control update tracking of the RSS document;

said processor receiving, from the application server, a request to provide updates of the web content represented by the RSS document; and said processor providing the updates of the web content specified in the received request to the application server such that the end device is enabled to receive the updates subject to the SIP SUBSCRIBE subscription.

* * * * *